INVENTORS.
Stephen J. Messelt
BY Wayne S. Paige
Daniel R. Levinson
ATTORNEY.

Fig. 3.

United States Patent Office 3,227,887
Patented Jan. 4, 1966

3,227,887
OBJECT POSITION PREDICTOR USING
FUNCTION GENERATORS
Stephen J. Messelt, Wilton, and Wayne S. Paige, Shelton,
Conn., assignors to The Perkin-Elmer Corporation,
Norwalk, Conn., a corporation of New York
Filed July 20, 1962, Ser. No. 211,445
6 Claims. (Cl. 250—220)

This invention relates to a device for generating a trigger signal for actuating means for recording the passage of a moving object. More specifically, the device is capable of actuating the recording means at the correct time so as to record the passing object despite the fact that the actual velocity of the object is unknown.

The device generally comprises a pair of means for detecting the passage of the object at two separate points in front of the recording means, each of the detecting means generating a signal, which signals are so related as to cause a pulse generator to emit a trigger signal at that time which corresponds to the passage of the object past the recording means. This is accomplished by generating a pair of saw-tooth voltages, each starting as the object passes one of these detecting stations, the slopes of these two voltages being inversely proportional to the distances from each of the detectors to the recording means. Since the point at which two such saw-tooth voltages are equal will represent (in time) the passage of the moving object past the recording means regardless of its velocity as along as its velocity remains constant during its movement, the final trigger signal is generated at the time of equality of the saw-tooth voltages.

In the specific embodiment hereinafter disclosed in detail, the device comprises a first detector assembly including a light source, which causes a beam of light to be reflected between a pair of parallel mirrors in a zig-zag manner and eventually to emerge so as to fall upon a photo-sensitive detector. The two parallel mirrors are so positioned that the moving object will pass therebetween so as to break the light fence made thereby and thus initiate a signal at the detector, which is then utilized to start a saw-tooth voltage of a given slope. The second detector is composed of similar elements and is positioned between the first detector and the recording means so as to be activated by the passage of the moving object at a later time. However, the saw-tooth voltage produced at the output end of the second detector assembly has a specifically different slope to that produced by the first detector assembly. In fact, the slopes of these two saw-tooth voltages are inversely proportional to the distances between the two detectors and the recording means. It will be subsequently shown that two such saw-tooth voltages will become equal at a point in time which represents the passage of the moving object past the recording means, irrespective of the constant velocity of the object. Therefore, a comparator circuit which "sees" both of these saw-tooth voltages may be utilized to initiate the trigger for the recording means so as to start the recording at the appropriate time, namely, when these two voltages are equal and therefore at the time the object passes the recorder.

The recorder may comprises a recording oscilloscope, a motion picture or still camera, or any other means, such as a radiometer or the like, for recording some physical aspect of the moving object at the time it reaches the recording means. Thus, the device may be utilized in conjunction with means for recording any physical phenomena of a moving object, such a projectile, a moving particle, a moving vehicle, or the tracks of nuclear or other atomic particles in a cloud chamber.

An object of the invention is therefore the provision of a device for generating a trigger signal for actuating a recording means at the correct time to "catch" the passage of a moving object, regardless of the actual velocity of the constantly moving object.

Other objects and advantages will appear to one skilled in the art upon reading the following specification in conjunction with the accompanying drawings, in which:

FIG. 3 is an electrical schematic of the electronics utilized for generating the two saw-tooth voltages, for comparing these two voltages, and for generating a trigger signal to actuate the recording means; and FIG. 4 is a diagram illustrating the two saw-tooth voltages and showing the manner in which the time for actuating the recording means is determined.

Figure 1:
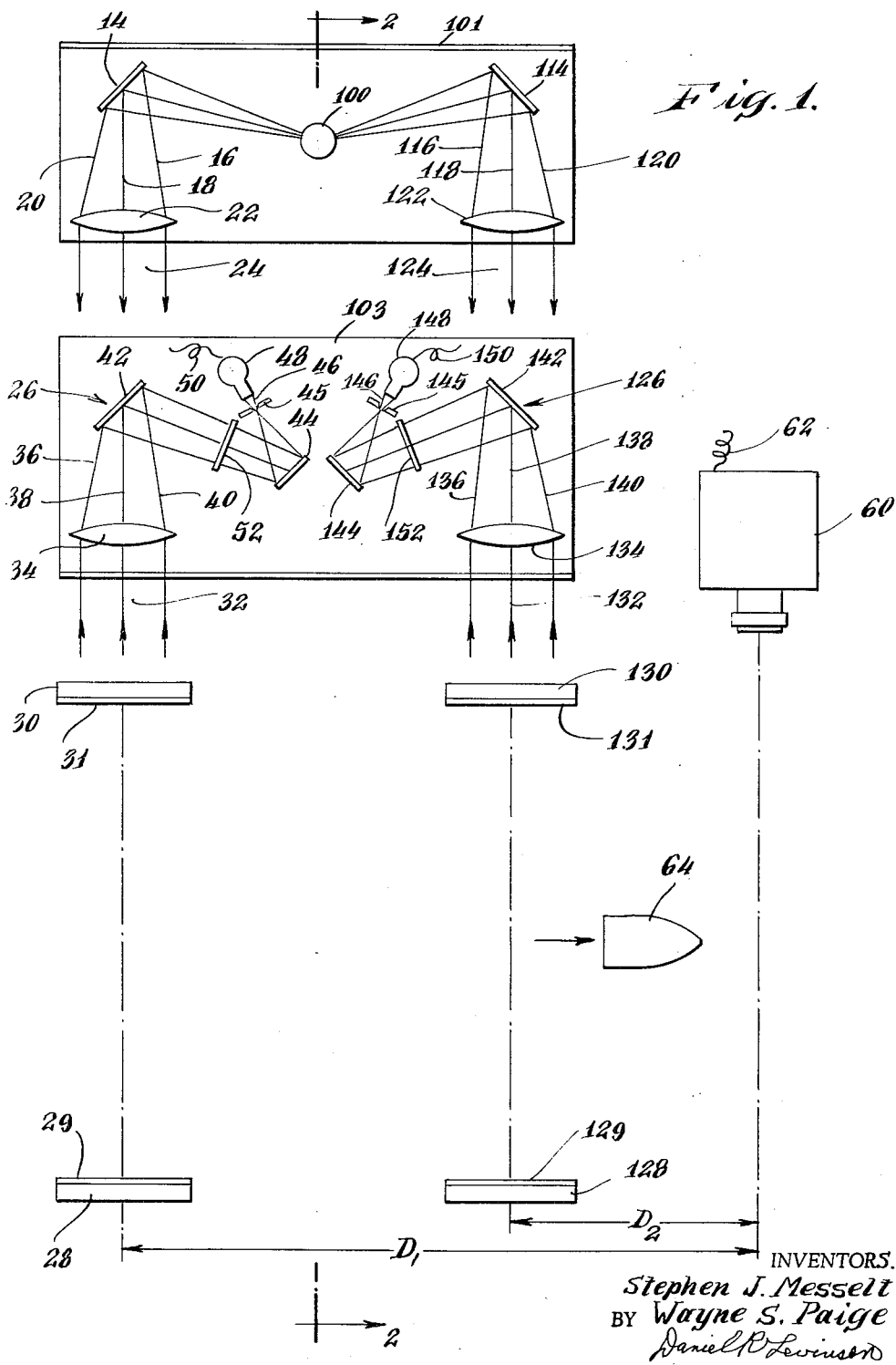
FIG. 1 is a partly schematic plan view of the recording means, the moving object, and the two detecting assemblies which initiate the saw-tooth voltages to be compared.
Figure 2:
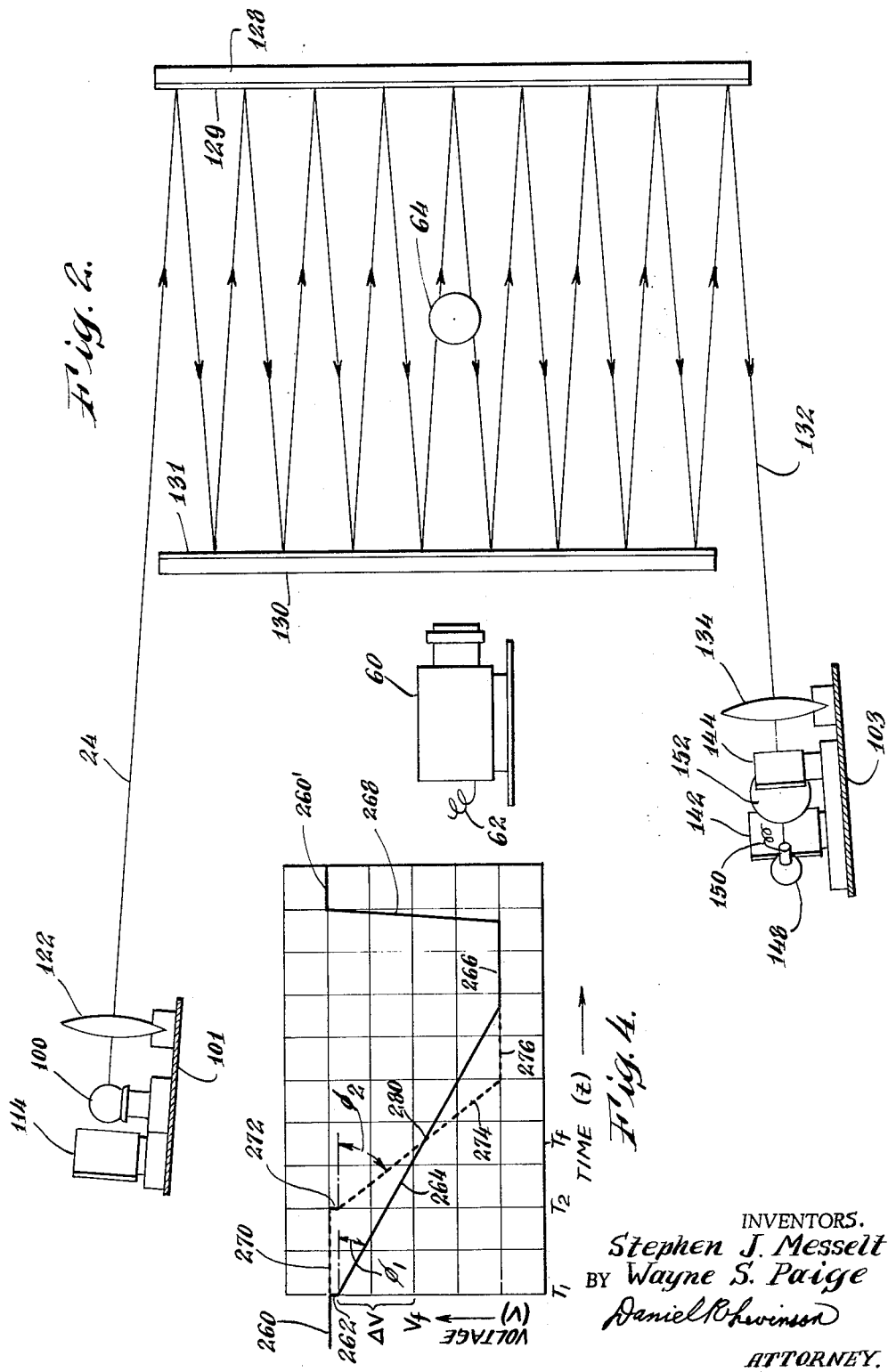
FIG. 2 is a partly schematic vertical view taken generally along the line 2—2 in FIG. 1 of this same device.

Before described the operation of the device in more detail, the various parts of the apparatus will be first described. In FIGS. 1 and 2, a light source 100 (which may be, for example, a tungsten lamp) is shown as producing light rays 12, 112 which are reflected by mirrors 14 and 114, respectively, so as to produce diverging rays 16, 18, 20, and 116, 118, and 120. The first group of these rays are collimated by lens 22 so as to produce parallel rays shown generally at 24; similarly, lens 122 collimates the other group of rays so as to form a parallel beam represented by ray 124. Light source 100, mirrors 14 and 114, and lenses 22 and 122 may be mounted on a chassis plate or board 101 in order to maintain the correct alignment and spacing of these elements. Rays 24 will pass over the detector assembly shown generally at 26 so as to reach the further one 28 of a pair of mirrors 28 and 30. These two mirrors have their reflecting faces 29 and 31, respectively, facing each other and are parallel to each other. Similarly, rays 124 pass over the second detector assembly (shown generally at 126) will be reflected from the reflective surface 129 of mirror 128 so as to proceed toward the reflective face 31 or mirror 130. The relationship of the last two mentioned mirrors is best seem in FIG. 2, wherein a single ray is shown as being reflected in a zig-zag pattern back and forth between the reflective surfaces 129 and 131 so as to form a light fence and ultimately to emerge from the bottom of mirror 128 as a beam of parallel rays, represented by central ray 132, directed towards the lens 134 of one of the two similar detectors. As shown in FIG. 1, the parallel beam of rays represented by ray 132 will be converged by lens 134 so as to form a converging beam represented by rays 136, 138, and 140. This beam, after being reflected by mirror 142 and mirror 144, will form a small image of the light source on the cathode 146 of photomultiplier 148, which may be a 1P21 tube operating at about 1000 volts. The output of this photomultiplier is carried by lead 150 to the electronic section of device which will be subsequently described in reference to FIG. 3.

Since the beam of rays represented by ray 24 will be reflected by parallel mirror 28 and 30 in substantially the same manner as just described for ray 124 with reference to mirrors 128 and 130, no specific showing or detailed description of this is deemed necessary. Similarly the focusing of the beam, represented by central ray 32, by the lens 34 and the reflection of rays 36, 38 and 40 by mirrors 42 and 44 so as to fall on the cathode 46 of photocell 48 having output lead 50 is substantially the same as previously described. Optical filters 52 and 152 (which may be of the interference type) may be positioned in the light beams before the photomultipliers in any convenient position so as to limit the light falling on these photomultipliers to the spectral content of the lamp 10 to eliminate undesired light emission from any object passing through the optical fence. Similarly, a mask slit 45, 145 may be positioned in front of each detector, at suitable positions to limit the field of view and the light to that emanating from the light source and by the paths just described.

Figure 3:
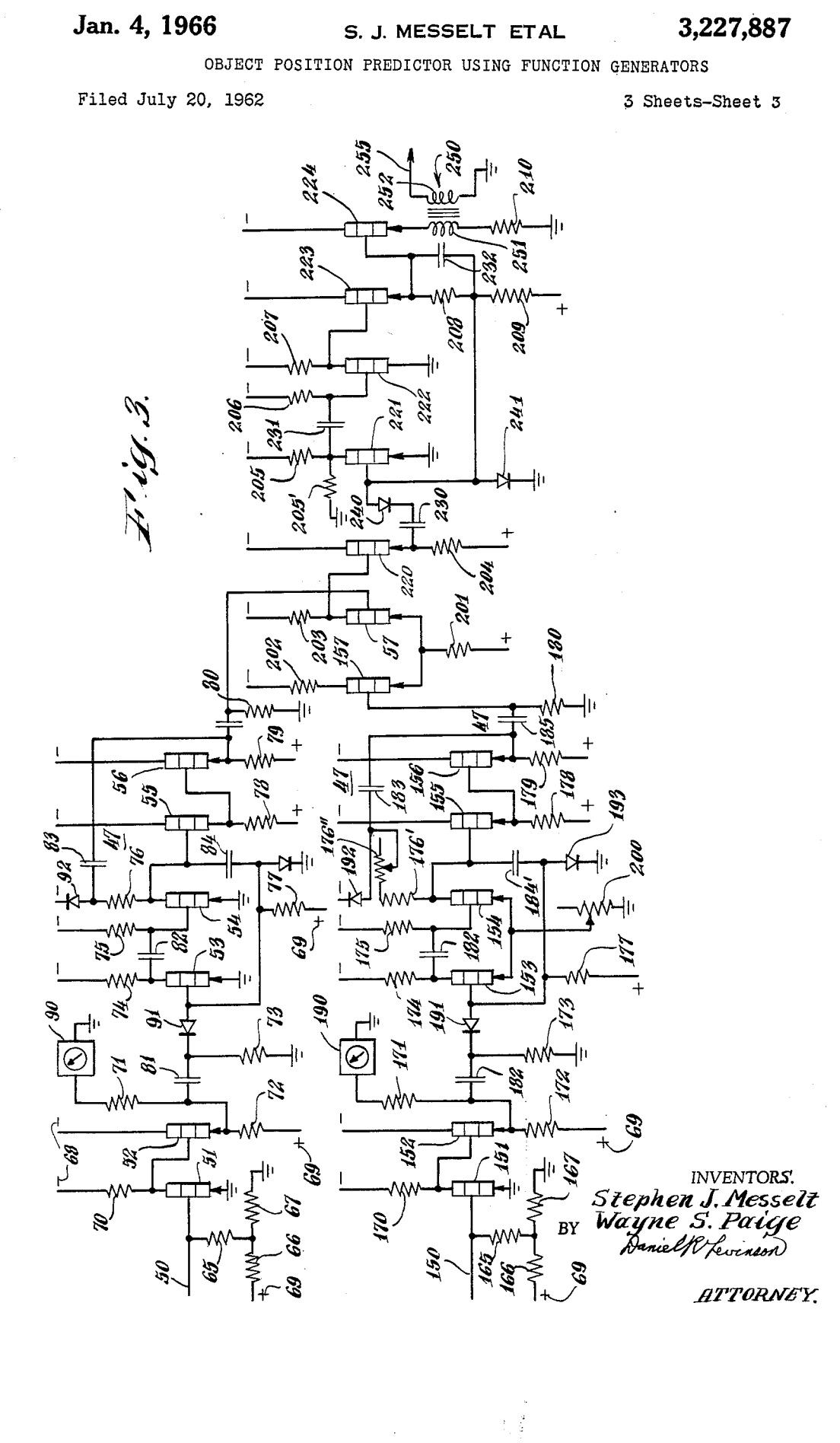

As can be readily seen in FIG. 1, all of the elements so far described having a reference numeral, between 10 and 50 form parts of one light source and detector assemblies, while the corresponding elements of the second light source and detector assemblies have reference numerals exactly 100 greater. The two detector systems are positioned at two different known distances, $D_1$ and $D_2$, in front of the recording means 60 which may be a camera, a recording oscilloscope, or the like. The recorder 60 is actuated or triggered by means of a trigger input 62. The means for producing this trigger signal will be described subsequently and is shown in FIG. 3. The elements of the two detector assemblies 26 and 126 are preferably mounted on a chassis as indicated at 103 in order to maintain the correct alignment and spacing therebetween.

Because of the relationship between the two detector assemblies and the recorder 60, a projectile 64 proceeding from the left in FIG. 1 will be detected by each of the detector systems as it passes through the light fences between mirrors 28 and 30 and 128 and 130 before it reaches the recorder 60. Thus, the passage of the projectile through the lit space between mirrors 28 and 30 will cause interruption of the illumination on the photomultiplier 48 (since the beams between the mirrors are spaced apart less than the cross-sectional diameter of the projectile), and its subsequent passage between mirrors 128 and 130 will similarly interrupt the light to photomultiplier 148. The pulses caused by the sudden darkening of these photomultipliers will be carried by leads 50 and 150 respectively into the electronic circuit shown in FIG. 3.

The photomultiplier output 50 is connected to the base of junction transistor 51 which functions as the first stage of an amplifier for this signal. Also connected to the base of transistor 51 is a resistance network composed of resistors 65, 66 and 67. Specifically, one end of resistor 65 is connected to the base of transistor 51 and the other end is connected to one end of each of resistors 66 and 67. The other end of resistor 66 is connected to the positive side of a supply of source voltage, represented by the plus sign 69. The other end of resistor 67 is grounded. As shown in FIG. 3, the emitter of this transistor 51 is connected to ground, and the collector is connected through resistor 70 to the negative side of the impressed source voltage as indicated by the minus sign 68. In addition, the collector of this transistor is connected to the base of transistor 52 which functions as the second and final stage of the amplifier. The emitter of transistor 52 is connected through resistor 72 to the positive side of the impressed voltage as indicated by the plus sign 69. The impressed source voltage, represented by the various minus signs 68 and plus signs 69, may be 21 volts D.C., for example. The emitter of transistor 52 is connected through resistor 71 to meter or indicator 90 and is also connected to a simple differentiating network composed of capacitor 81 and grounded resistor 73. The pulse produced by the differential of the amplifier photomultiplier signal is then rectified by diode 91 before entering a bootstrap circuit which forms the desired saw-tooth voltage form. This bootstrap circuit includes a transistor 53, the base of which receives this rectified signal. The emitter of this transistor is grounded, while the collector is connected through resistor 74 to the negative side of the impressed source voltage. The collector is also connected through capacitor 82 to the base of next transistor 54, which is also connected through resistor 75 to the negative side of the source voltage. The collector of transistor 54 is connected to the negative side of the source voltage through diode 92 and resistor 76. This collector is also connected to the base of transistor 55 and, by a separate lead, to ground through capacitor 84 and diode 93. The base of transistor 53 is connected both to grounded resistor 77 and to a point between capacitor 84 and diode 93. The emitter of transistor 55 is connected to the base of transistor 56 and is also connected through resistor 78 to the positive side of the source voltage. The collectors of both of the transistors 55 and 56 are directly connected to the negative side of the source voltage. The emitter of transistor 56 is connected to the positive side of the impressed voltage through resistor 79 and is also connected back through capacitor 83 to a point between diode 92 and resistor 76. In addition, this emitter is connected through a differentiating network composed of capacitor 85 and resistor 80 to the base of a transistor 57 which comprises one side of a comparator circuit. Before describing the rest of the circuit, the photomultiplier amplifier and bootstrap circuit for the second detector assembly will be described.

The photomultiplier amplifier and bootstrap circuits for the output 150 of photomultiplier 148 are both quite similar to the amplifier and bootstrap circuits just described. In fact, since the amplifier and first differentiating circuits are identical, they will not be described again. Indeed, not only are the elements to the left of diode 191 identical to the corresponding elements numbered 100 less, but also most of the elements to the right thereof up to and including resistor 180 are also identical to the corresponding elements of the bootstrap circuit previously described. The elements in these circuits which are identical to the corresponding elements of the previously described circuits are numbered exactly 100 higher. Wherever the elements differ, in any manner whatsoever from the first bootstrap circuit, this has been indicated by using a prime or double prime of the number which is 100 higher than the reference numeral for the corresponding element.

Thus, the first two transistors 153 and 154 and the connections from the collector of the former to the base of the latter and to the negative side of the source voltage are identical to these previously described. Similarly, resistors 174 and 175 and capacitor 182 are identical to and are identically arranged as compared to the corresponding elements in the first bootstrap circuit. Similarly, the base of transistor 153 is connected in the same manner through an identical resistor 177 to the positive side of the source voltage. However, the emitters of both transistors 153 and 154, instead of being connected directly to ground, are both connected to a variable resistor 200 which in turn is grounded. The collector of transistor 154 is connected through fixed resistor 176' and variable resistance element 176" through diode 192 to the negative side of the source. This connection is actually quite similar to the corresponding connection of the collector of transistor 54, differing only in that the resistance value is variable about values similar to that of resistor 76. The collector of transistor 154 is also conected to capacitor 184' and diode 193 to ground in a manner similar to the collector of transistor 54, the difference in the connection consisting solely in the value of capacitor 184' as compared to capacitor 84. All the rest of the bootstrap circuit including transistors 155 and 156 and all their connections are identical to the corresponding parts of the first bootstrap circuit. Thus, the final output of this circuit, which is similar to the output of the first bootstrap but will differ as to the slope of the saw-tooth or sweep voltage produced, is ultimately fed to the base of transistor 157 which forms the other half of the comparator circuit.

The comparator circuit includes not only the two transistors 57 and 157 but also a common connection from the positive side of the source voltage through resistor 201 to the emitters of both of these transistors. Similarly the collectors of these transistors are connected through resistors 202 and 203 respectively to the negative side of the source voltage. In the specific example of the circuit, the values of the elements which will be subsequently given, resistors 201, 202, and 203 are identical to each other. The collector of transistor 57 is also connected to the base of transistor 220, the collector of which is directly connected to the negative side of the source voltage. The emitter of transistor 220 is connected to the positive side of the source through resistor 204 and is also connected through capacitor 230 to diode 240. The other side of diode 240 is connected to the base of transistor 221 the emitter of which is grounded. The collector of transistor 221 is connected to the negative side of the source voltage through resistor 205, is connected to ground through resistor 205', and is also connected through capacitor 231 to the base of transistor 222, the emitter of which is also grounded. The base of transistor 222 is also connected through resistor 206 to the negative side of the source voltage, as is the collector through resistor 207. The collector of this transistor is also connected to the base of transistor 223, the collector of which is connected to the negative side of the source. The emitter of transistor 223 is connected to a parallel RC network which includes resistor 208 and capacitor 232. The other side of this network is connected to the base of transistor 221 and through resistor 209 to the positive side of the source voltage. The base of transistor 221 is also connected through a diode 241 to ground. The emitter of transistor 223 is connected to the base of final transistor 224, the collector of which is connected to the negative side of the source voltage. The emitter of this transistor 224 is connected to one side of the primary coil 251 of transformer 250, the other end of the primary coil being grounded through resistor 210. The secondary coil 252 of transformer 250 may be grounded at one side and supply, at the other side, the trigger signal for the recording means at ouput 255.

The operation of the electronic circuit shown in FIG. 3 will now be described. As long as the photomultiplier 48 is receiving light from the light source 100, the output 50 thereof will maintain transistor 51 in a saturated condition. When transistor 51 is so saturated, its collector and therefore the base of transistor 52 will be maintained substantially at ground potential. Interruption of the light upon photomultiplier 48 will cause the output 50 to drop substantially to zero, thereby cutting off transistor 51. With transistor 51 in this substantially nonducting state, the collector thereof will be at a negative potential on the order of −18 volts assuming that the source potential is approximately 21 volts. This negative potential applied to the base of transistor 52 will cause its becoming suddenly conductive so as to produce a pulse across the differentiating network composed of capacitor 81 and resistor 73. This negative pulse will cause the saturation of transistor 53 when it reaches its base to thereby cut off transistor 54, which previously was in a saturated condition. The reason that transistor 54 is cut off is similar to that causing the cutting off of transistor 52. As soon as transistor 54 ceases to be conducting, capacitor 84 will start to be charged by the current flowing through resistance 76. Transistors 55 and 56 are Darlington emitter-followers providing low impedance and act as a bootstrap in a more or less conventional manner so as to maintain a constant voltage across capacitor 84, thereby causing it to charge linearly. The particular values of resistor 76 and capacitor 84 will determine the slope of the final output of this circuit which is applied to the base of transistor 57.

The resistance network composed of resistors 65, 66, and 67 protect the base of transistor 51 from excessive negative potentials which might damage this transistor. Meter or detector 90 is provided in order to assist in determining the proper set-up of the light source, photomultipler and associated elements shown in FIG. 1. When these elements are in proper alignment, meter 90 should show a zero reading, thereby indicating that the photomultiplier output is maintaining transistor 51 fully saturated and transistor 52 cut off. If the photomultipler output is not at a maximum because of misadjustment of FIG. 1 set-up or aging of some of the components, meter 90 will indicate this by showing a value greater than zero. The purpose of diode 93 is to maintain the saturated state of transistor 53 while capacitor 84 is charging, thereby preventing the resetting of this transistor prematurely.

The operation of the amplifier and bootstrap circuits associated with the output 150 of the second photomultiplier 148 is substantially the same as that for the first photomultiplier just described. However, in order to allow a slight adjustment of the slope of the saw-tooth produced by this circuit, resistor 76 is replaced by a fixed resistor 176' and a variable resistor 176". The values of these last two mentioned resistors are so chosen that their combined resistance is variable about values similar to the value of resistor 76. In the table of exemplary values for the elements of one specific embodiment of the inventive circuit (to be given later), capacitor 184' has a value of ½ the value of capacitor 84. This will cause the slope of the second bootstrap circuit saw-tooth output to be ½ that of the first bootstrap circuit.

The comparator circuit composed of transistors 57 and 157 will trigger the conventional mono-stable circuit composed of transistors 221 and 222, when the voltages applied to the bases of transistors 57 and 157 have become equal. This triggering is accomplished through transistor 220. Resistors 205 and 205' form a voltage dividing network in order to protect transistor 222 from receiving excessive voltage on its base. Resistor 208 provides positive or regenerative feedback from the emitter of transistor 223 so as to make the final trigger pulse have a very fast rise time. Diode 241 prevents excessive reverse bias from being applied to the base of transistor 221. The final output at 255 will be in the form of a sharp spike of comparatively high voltage caused by the operation of step up transformer 250 on the output of emitter-follower transistor 224. This final output 255 is then fed to the recording means 60 by means of input 62. Thus, output 255 acts to start the recorder at the appropriate time so as to record the passage of projectile 64.

The reason why the recorder should be triggered when the saw-tooth voltages of the two bootstrap circuits are equal is best understood from a consideration of FIG. 4. FIG. 4 shows the output of the first bootstrap circuit (i.e., the voltage applied to the base of transistor 57), in solid lines and shows the steeper saw-tooth voltage of the second bootstrap circuit (applied to the base of transistor 157) in dashed lines. The first voltage will comprise a horizontal constant voltage part 260 when the photomultiplier 48 is receiving the full amount of light from light source 10. This will be followed by a short vertical drop as shown at 262 as the light is initially interrupted by the projectile 64 between mirrors 28 and 30 (see FIG. 1). The saw-tooth voltage in the first bootstrap circuit will then decrease along the straight portion 264 until it finally reaches a minimum as shown by the straight line horizontal portion 266. The voltage will eventually be reset to its initial value as shown at 265 by being raised along almost vertical line 268. As previously explained, the constant slope straight line portion 264 is caused by the charging of capacitor 84 as regulated by the following bootstrap circuit. The corresponding saw-tooth voltage for the second circuit will have a similar initial voltage as shown by the horizontal portion 270. This will be followed by a small drop in the voltage as illustrated by the short horizontal line segment 272 and then by the sloping straight line portion 274, which is finally followed by the minimum portion 276. The voltage from the second bootstrap circuit will start to fall (at 272 and 274) at the time the projectile has passed between mirrors 128 and 130, which is of course subsequent to the corresponding drop in the voltage of the first bootstrap. Since the slope of the saw-tooth portion 274 is greater than that of portion 264, these portions will cross at some point such as shown at 280. The time that the first saw-tooth voltage starts decreasing has been assigned the abscissa value $T_1$, that of the start of the second saw-tooth voltage $T_2$, and the crossing point $T_f$ since this is the final time, which corresponds to the passage of the projectile in front of the recorder 60. $V_f$ is the voltage values of the two saw-tooth voltages corresponding to this crossing time, $T_f$. The small vertical drop in voltage at 272 is made equal to small vertical drop in voltage shown at 262 by adjusting the value of variable resistor 200 (see FIG. 3).

It will now be shown that the time of cross $T_f$ will be the correct time for energizing the recorder if the slopes of the two saw-tooth voltage portions 264 and 274 are made inversely proportional to the distances between the recorder and the first and second detector assemblies. The negative slope of the two straight line decreasing voltages are measured by the negative angles $\phi_1$ and $\phi_2$ taken from the horizontal. Thus, by definition the negative slope of the first line 264 is equal to the tangent of $\phi_1$, which in turn is equal to the change in the voltage divided by the change in the time as may be seen in FIG. 4. Similarly, the slope of line 274 may be defined by the tangent of $\phi_2$ or the corresponding change in the ordinate voltage value divided by the corresponding time change. Thus, defining $S_1$ and $S_2$ as the slopes of the two saw-tooth voltage segments 264 and 274, and $\Delta V$ as the voltage change from the meeting points of short line segments 262 and 272 and lines 264 and 274, respectively, to $V_f$ as shown in FIG. 4, we may write:

$$S_1 = \tan \phi_1 = \frac{\Delta V}{T_f - T_1} \quad (1)$$

$$S_2 = \tan \phi_2 = \frac{\Delta V}{T_f - T_2} \quad (2)$$

wherein $S_1$, $S_2$, $\phi_1$, $\phi_2$ (and therefore $\tan \phi_1$ and $\tan \phi_2$) and $\Delta V$ are all negative.

Rewriting and equating these two equations, they become:

$$\Delta V = S_1(T_f - T_1) = S_2(T_f - T_2) \quad (3)$$

Since the projectile, travelling at a constant velocity ($v$), will traverse the distance from the first detector to the recorder ($D_1$) in the time interval which is equal to the time it reaches the recorder less the time it has passed the first detector, we may write:

$$(T_f - T_1) = D_1/v \quad (4)$$

Similarly, the time taken for the projectile to travel between the second detector and the recorder and the distance ($D_2$) therebetween are related in the following manner:

$$(T_f - T_2) = D_2/v \quad (5)$$

By substituting the values of $T_f - T_1$ and $T_f - T_2$ given in Equations 4 and 5 for these expressions in Equation 3, we obtain:

$$S_1 \frac{(D_1)}{v} = S_2 \frac{(D_2)}{v} \quad (6)$$

By multiplying both sides by $v$ and rearranging the terms, Equation 6 may be rewritten as:

$$\frac{S_1}{S_2} = \frac{D_2}{D_1} \quad (7)$$

This last equation shows the crossing point 280 in FIG. 4 will be the desired point in time that the projectile passes the recorder, if the slopes of the saw-tooth voltages 264 and 274 are in fact inversely proportional to the associated detector-to-recorder distances. For example, where the distance $D_1$ is twice the distance $D_2$, the slope of the first saw-tooth voltage 264 will be ½ of that of the second 274. Generally, the apparatus will be designed so as to maintain the distance between the detector assemblies fixed by mounting the elements on common chassis, such as indicated at 101 and 103 in FIG. 1. Once the distance between these two assemblies has been decided upon, the entire device may be positioned the appropriate distance in front of the recorder. For example, if the distance between the detectors is 1 foot, then the detectors would be positioned so that the recorder is one foot behind the second detector, where the two saw-tooth voltage slopes are in a ratio of 1:2. In order to allow a slight adjustment of the slope of the second saw-tooth voltage, the previously described variable resistor 176″ may be adjusted thereby to vary the crossing point of the two saw-tooth voltages. This adjustment will allow correction of any small errors in the spacing of the elements shown in FIG. 1 as well as allowing the recorder to record the front, middle, end, or wake of the projectile.

In order to more fully understand the reason why the device will always trigger the recorder at the correct time to catch the passing of projectile thereby, let us investigate what will happen if the projectile is travelling at a rate greater than that represented in FIG. 4. Under such conditions, the first detector signal will start at a time ahead of (i.e., to the left of) that shown at 262 and $T_1$ in FIG. 4. Thus, the downwardly sloping part of the saw-tooth voltage will be also to the left of the line 264 but parallel thereto. For this higher velocity projectile, the second saw-tooth voltage will be initiated not only earlier than shown in FIG. 4, but will be initiated earlier by an amount somewhat greater than the amount that the first saw-tooth is earlier than that shown in FIG. 4. In other words, the new downwardly sloping part of the second saw-tooth will be parallel to line 274 but will be even more to the left of line 274 than the new first saw-tooth sloping line is to the left of line 264. The physical reason for this is that the faster projectile will not only pass each of the detectors sooner than that shown in FIG. 4, but it will also require less time to travel the distance therebetween. Therefore, $T_1$ will move to the left some particular amount, which we may call $\Delta T_1$, and $T_2$ will move to the left a certain amount, which we shall define $\Delta T_2$; and $\Delta T_1$ is less than $\Delta T_2$. Obviously, if both $T_1$ and $T_2$ are moved to the left by the same particular amount, $T_f$ would also move to the left by this same particular amount (this would simply shift all of the lines in FIG. 4 to the left the same amount). By shifting $T_1$ the distance $\Delta T_1$ to the left and shifting $T_2$ the larger distance $\Delta T_2$ to the left, $T_f$ will be shifted to the left the distance $\Delta T_1$ plus an additional distance caused by the shifting of the second (dotted) lines the additional distance $$\Delta T_2 - \Delta T_1$$

Graphically, this is caused by the second downward sloping (dotted) line crossing the first at a point higher on (or to the left of) that shown in FIG. 4. As has been previously shown, this additional relative shifting (of the amount $\Delta T_2 - \Delta T_1$) will exactly correct for the fact that the projectile will take less time in its travel between the second detector and the recorder so as to trigger the latter at the correct time.

Similarly, if the projectile is travelling slower than represented by FIG. 4, the first saw-tooth (solid lines) will be moved a certain distance to the right in time and the second (doted lines) saw-tooth will be moved to the right a somewhat greater distance. This will delay the triggering of the recorder not only by the time required for the projectile to reach the detectors but also by the additional amount of time which it will require to travel from the second detector to the recorder. It should be noted that the comparison circuit determines the crossing point in FIG. 4 by looking for equality of the two saw-tooth voltages; but it could (with somewhat different circuitry) look for an equal drop ($\Delta V$) in each of the two saw-tooth voltages. In fact, where such a change in voltage is used in the comparison circuit, the two saw-tooth voltages need not even start at the same amplitude. Thus, shifting of the two saw-tooth voltages vertically up or down would not affect a comparison circuit which looks only for equal voltage drops in the two saw-tooth voltages. The illustrated comparison circuit has, however, the great advantage of simplicity over the alternative just mentioned, which requires voltage change detection.

An example of the circuit elements shown in FIG. 3 which will produce two saw-tooth voltages having the desired exemplary slope ratio of 1:2 as shown in FIG. 4 is given in the following table:

| Resistors (all are ½ watt) | | Ohms |
|---|---|---|
| 65 | 165 | 470K |
| 66 | 166 | 15K |
| 67 | 167 | 10K |
| 70 | 170 | 10K |
| 71 | 171 | 150K |
| 72 | 172 | 22K |
| 73 | 173 | 47K |
| 74 | 174 | 3.3K |
| 75 | 175 | 68K |
| 76 | | 3.3K |
| | 176' | 2.7K |
| | 176'' | (1) |
| 77 | 177 | 680K |
| 78 | 178 | 47K |
| 79 | 179 | 5.6K |
| 80 | 180 | 22K |
| 200 | | (2) |
| 201 | | |
| 202 | | 4.7K |
| 203 | | |
| 204 | | 10K |
| 205 | | |
| 205' | | 3.3K |
| 207 | | |
| 206 | | 68K |
| 208 | | 39K |
| 209 | | 82K |
| 210 | | 470 |
| Capacitors | | μFarads |
| 81 | 181 | .0022 |
| 82 | 182 | .033 |
| 83 | 183 | 47 |
| 84 | | .2 |
| | 184' | .1 |
| 85 | 185 | 47 |
| 230 | | [3] 240 |
| 231 | | .22 |
| 232 | | [3] 240 |

[1] Variable, 0–1,000 maximum.
[2] Variable, 0–100 maximum.
[3] μμFarads.

All transistors are 2N599—All diodes are 1N914.

In a device actually made according to the previous specific embodiment the system was capable of recording the passage of a high velocity projectile having a constant velocity anywhere between 4,000 and 20,000 feet per second. For this type of high-speed projectiles, a recording oscilloscope was utilized as the recorder, but, of course, other recording devices such as high-speed cameras and the like may be utilized instead. The photomultipliers utilized in this specific device were 1P21 tubes, having a cathode potential of about −1,000 volts impressed across the tube so that there is about a 100 volte difference between each of the nine dynodes and the cathode. Where the device is intended for use in highly evacuated environments (as are utilized in shock tubes for testing projectiles travelling at the supersonic speeds indicated above), the electrical leads and circuit elements should be potted in order to avoid arcing. For this purpose "Scotchcast" brand of epoxy resin has been found to be suitable. The various high-voltage cable connectors may be potted in the material sold under the brand name "RTV-11 Silastic."

In the particular device actually made, the light beams emanating from the light source assembly (i.e., bundle of rays shown at 24 and 124 in FIG. 1) are masked so as to have a height of two inches and a width of ½ inch (i.e., two inches in vertical direction in FIG. 2 and ½ inch in the direction perpendicular to the paper in this figure). In this constructed device the light source assembly and detector assembly were positioned at such an angle to the parallel mirrors that the light beam made nine round trips between the mirrors before emerging on to the detectors. In this particular device the vertical extent of the two parallel mirrors was sufficient to allow the light fence created by the beam to have a vertical height of 36 inches.

Although a specific apparatus has been completely described, the invention is not limited to any of the structural details. On the contrary, the broadest inventive feature is deemed the ability of the device to generate a trigger signal at the appropriate time regardless of the unknown velocity of the moving object. In its more limited aspects, the invention also provides a comparatively straight-forward way of obtaining this desired trigger signal. Therefore, the invention is not intended to be limited by any of the details of the disclosed preferred embodiment but rather is defined by the scope of the appended claims.

I claim:

1. A device for determining the time a moving object having an unknown, substantially constant velocity will reach a desired position comprising:
   a first detector assembly, adapted to be positioned at a first known distance in front of said desired position, for determining the passage of said object thereby and indicating said passage by a first detector output signal;
   a second detector assembly, adapted to be positioned between said first detector assembly and said desired position at a second known distance in front of said desired position, for determining the passage of said object thereby and indicating said passage by a second detector output signal;
   a first function-generating means for creating a first time-dependent, variable quantity function signal when actuated by said first detector output signal;
   said first function signal having, as a parameter of its quantity variation with time, said second known distance;
   a second function-generating means for creating a secondtime-dependent, variable quantity function signal when actuated by said second detector output signal;
   said second function signal having, as a parameter of its quantity variation with time, said first known distance;
   means for receiving and comparing the quantity of said first function signal and said second function signal so as to determine a specific relationship therebetween which occurs at the time said object reaches said desired position regardless of its unknown, substantially constant velocity.

2. A device for determining the time a moving object having an unknown, substantially constant velocity will reach a desired position comprising:
   a first detector assembly, adapted to be positioned at a first known distance in front of said desired position, for determining the passage of said object thereby and indicating said passage by a first detector output signal;
   a second detector assembly, adapted to be positioned between said first detector assembly and said desired position at a second known distance in front of said desired position, for determining the passage of said object thereby and indicating said passage by a second detector output signal;
   a first function-generating means for creating a first time-dependent, variable quantity function signal when actuated by said first detector output signal;
   said first function signal having, as one parameter, the time of passage of said object past said first detector assembly and having, as another parameter, said second known distance;
   a second function-generating means for creating a second time-dependent, variable quantity function signal when actuated by said second detector output signal;
   said second function signal having, as one parameter, the time of passage of said object past said second detector assembly and having as another parameter, said first known distance;

means for receiving and comparing the quantities of said first function signal and said second function signal so as to determine a specific relationship therebetween which occurs at the time said object reaches said desired position regardless of its unknown, substantially constant velocity.

3. A device for determining the time a moving object having an unknown, substantially constant velocity will reach a desired position comprising:

a first detector assembly, adapted to be positioned at a first known distance in front of said desired position, for determining the passage of said object thereby and indicating said passage by a first detector output signal;

a second detector assembly, adapted to be positioned between said first detector assembly and said desired position at a second known distance in front of said desired position, for determining the passage of said object thereby and indicating said passage by a second detector output signal;

a first function-generating means for creating a first function signal when actuated by said first detector output signal;

said first function signal comprising a straight line portion having a non-zero, finite slope;

a second function-generating means for creating a second function signal when actuated by said second detector output signal;

said second function signal comprising a straight line portion also having a non-zero, finite slope;

the ratio of the slope of said straight line portion of said first function signal to the slope of said straight line portion of said second function signal being equal to the ratio of said second known distance to said first known distance;

and means for receiving and comparing said first function signal and said second function signal so as to determine a specific relationship therebetween which occurs at the time said object reaches said desired position.

4. A device for determining the time a moving object having an unknown, substantially constant velocity will reach a desired position comprising:

a first detector assembly, adapted to be positioned at a first known distance in front of said desired position, for determining the passage of said object thereby and indicating said passage by a first detector output signal;

a second detector assembly, adapted to be positioned between said first detector assembly and said recorder at a second known distance in front of said desired position, for determining the passage of said object thereby and indicating said passage by a second detector output signal;

a first function-generating means for creating a first time-dependent function signal when actuated by said first detector output signal;

said first function signal being of a certain initial amplitude at the time of actuation of said first function-generating means by said first detector output signal, the amplitude varying thereafter along a straight line portion having a non-zero, finite slope;

a second function-generating means for creating a second time-dependent function signal when actuated by said second detector output signal;

said second function signal being of a predetermined initial amplitude at the time of actuation of said second function-generating means by said second detector output signal, the amplitude varying thereafter along a straight line portion also having a non-zero, finite slope;

the ratio of the slope of said straight line portion of said first function signal to the slope of said straight line portion of said second function signal being equal to the ratio of said second known distance to said first known distance;

and means for receiving said first and said second function signals for comparing the change from said certain initial amplitude in the amplitude of said first function signal with the change from said predetermined amplitude in the amplitude of said second function signal to determine the time at which said two changes are equal, which time occurs when said object reaches said desired position.

5. The device of claim 4, in which:

said certain initial amplitude of said first function signal is equal to said predetermined initial amplitude of said second function signal so that said first and second function signals have equal amplitudes when the amplitude changes of said signals therefrom are equal;

and said means for receiving and comparing said two function signals comprises means for directly comparing the amplitudes of said two function signals so as to determine when said amplitudes are equal.

6. A device for generating a trigger signal capable of actuating a recorder at the time a moving object having an unknown, substantially constant velocity reaches a desired position relative thereto, comprising:

a first detector assembly, adapted to be positioned at a first known distance in front of said desired position, for determining the passage of said object thereby and indicating said passage by a first detector output signal;

a second detector assembly; adapted to be positioned between said first detector assembly and said desired position at a second known distance in front of said desired position, for determining the passage of said object thereby and indicating said passage by a second detector output signal;

a first function-generating means for creating a first function signal when actuated by said first detector output signal;

said first function signal comprising a straight line portion having a non-zero, finite slope;

a second function-generating means for creating a second function signal when actuated by said second detector output signal;

said second function signal comprising a straight line portion also having a non-zero, finite slope;

the ratio of the slope of said straight line portion of said first function signal to the slope of said straight line portion of said second function signal being equal to the ratio of said second known distance to said first known distance;

means for receiving and comparing said first function signal and said second function signal so as to determine a specific relationship therebetween which occurs at the time said object reaches said desired position;

and means for generating a trigger signal when said comparing means determines said specific relationship, said trigger signal thereby being capable of actuating a recorder when said moving object reaches said desired position.

References Cited by the Examiner

UNITED STATES PATENTS

| | | | |
|---|---|---|---|
| 2,415,168 | 2/1949 | Gieseke | 250—210 |
| 3,013,208 | 12/1961 | Voznak | 324—68 |
| 3,025,406 | 3/1962 | Stewart et al. | 250—220 |

RALPH G. NILSON, *Primary Examiner.*

WALTER STOLWEIN, FREDERICK M. STRADER,
*Examiners.*